(12) United States Patent
Kim et al.

(10) Patent No.: US 11,114,216 B2
(45) Date of Patent: Sep. 7, 2021

(54) ALUMINUM-RESIN COMPOSITE, INSULATED ALUMINUM WIRE, FLAT CABLE AND PROCESSES FOR PRODUCING THE SAME

(71) Applicant: FURUKAWA ELECTRIC CO., LTD., Chiyoda-ku (JP)

(72) Inventors: Yong Hoon Kim, Tokyo (JP); Shoji Koizumi, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 657 days.

(21) Appl. No.: 15/084,907

(22) Filed: Mar. 30, 2016

(65) Prior Publication Data
US 2016/0211051 A1 Jul. 21, 2016

Related U.S. Application Data (63) Continuation of application No. PCT/JP2014/076303, filed on Oct. 1, 2014.

(30) Foreign Application Priority Data

Oct. 3, 2013 (JP) ................ JP2013-208186

(51) Int. Cl.
*H01B 7/02* (2006.01)
*H01B 3/30* (2006.01)
(Continued)

(52) U.S. Cl.
CPC .............. *H01B 7/02* (2013.01); *C22C 21/00* (2013.01); *C22F 1/04* (2013.01); *H01B 3/306* (2013.01);
(Continued)

(58) Field of Classification Search
CPC ........ H01B 7/08; H01B 7/0838; B32B 15/08; B32B 15/092; B32B 15/095; B32B 15/20;
(Continued)

(56) References Cited

U.S. PATENT DOCUMENTS 3,702,788 A * 11/1972 Haller .................... B32B 15/08
428/379
4,985,313 A * 1/1991 Penneck ................ C23C 28/00
428/627
(Continued)

FOREIGN PATENT DOCUMENTS

CN 101356055 A 1/2009
CN 103128442 A 6/2013
(Continued)

OTHER PUBLICATIONS

Zheludkevich, Sol-gel coatings for corrosion protection of metals, 2005, Journal of Materials Chemistry, vol. 15, pp. 5099-5111. (Year: 2005).*

(Continued)

*Primary Examiner* — Monique R Jackson
(74) *Attorney, Agent, or Firm* — Marshall, Gerstein & Borun LLP (57) ABSTRACT

The present invention relates to an aluminum-resin composite and provides the aluminum-resin composite which is excellent in adhesive property between metal and resin and is applicable to a continuous production process such as a wire production process. Specifically, the present invention uses the aluminum-resin composite including a metal made of aluminum or an aluminum alloy and resin adhering to the metal via an alumina nanoporous layer formed on a surface of the metal. The alumina nanoporous layer contains alu-
(Continued)

mina nanoparticles of 5 nm to 10 nm in average particle diameter and holes three-dimensionally communicating with one another.

9 Claims, 7 Drawing Sheets

(51) Int. Cl.
*H01B 7/08* (2006.01)
*C22F 1/04* (2006.01)
*C22C 21/00* (2006.01)
*H01B 7/00* (2006.01)

(52) U.S. Cl.
CPC .......... *H01B 3/308* (2013.01); *H01B 7/0009* (2013.01); *H01B 7/08* (2013.01)

(58) Field of Classification Search
CPC .. B23K 26/352; B23K 26/354; B23K 26/355; B23K 26/3568; B23K 26/3576; B23K 26/3584; B23K 2103/10; B23K 26/0624
See application file for complete search history.

(56) References Cited

U.S. PATENT DOCUMENTS

| | | | |
|---|---|---|---|
| 6,340,518 B1 * | 1/2002 | Kitahara | B32B 7/02 156/153 |
| 8,629,352 B2 | 1/2014 | Ando et al. | |
| 2010/0098910 A1 * | 4/2010 | Naritomi | B32B 7/12 428/141 |
| 2011/0024156 A1 | 2/2011 | Ando et al. | |
| 2012/0255761 A1 | 10/2012 | Shanai et al. | |
| 2012/0305651 A1 * | 12/2012 | Anderson | B82Y 30/00 235/492 |
| 2012/0328905 A1 * | 12/2012 | Guo | C21D 8/0294 428/687 |
| 2014/0290977 A1 * | 10/2014 | Aspas Puertolas | H01B 7/0838 174/113 R |
| 2014/0356578 A1 * | 12/2014 | Brandl | C22F 1/057 428/141 |

FOREIGN PATENT DOCUMENTS

| | | | | |
|---|---|---|---|---|
| JP | 57-180812 | | 11/1982 | |
| JP | 63-299922 | | 12/1988 | |
| JP | 04-009597 | | 1/1992 | |
| JP | 2007-277613 | | 10/2007 | |
| JP | 2009101563 A | * | 5/2009 | |
| JP | 2009-126126 | | 6/2009 | |
| JP | 2010-000679 | | 1/2010 | |
| JP | 2010-167475 A | | 8/2010 | |
| JP | 2011/029100 A | | 2/2011 | |
| JP | 2011-052292 | | 3/2011 | |
| JP | 2012066383 A | * | 4/2012 | ....... B29C 45/14778 |
| JP | 2012-166546 | | 9/2012 | |
| JP | 2012-220675 | | 11/2012 | |
| JP | 2012-227114 | | 11/2012 | |
| JP | 2013-111881 | | 6/2013 | |
| WO | WO-03/064150 A1 | | 8/2003 | |
| WO | WO-2007/094177 A1 | | 8/2007 | |
| WO | WO-2013/123770 A1 | | 8/2013 | |

OTHER PUBLICATIONS

Metroke, Passivation of metal alloys using sol-gel derived materials—a review, 2001, Progress in Organic Coatings, vol. 41, pp. 233-238. (Year: 2001).*
Machine translation of JP2012-066383A, published Apr. 2012. (Year: 2012).*
Machine translation of JP2009-101563A, published May 2009. (Year: 2009).*
Schmidt, Considerations about the sol-gel process: From the classical sol-gel route to advanced chemical nanotechnologies, 2006, J Sol-Gel Sci Techn vol. 40, pp. 115-130. (Year: 2006).*
Shi, A Translucent and Superhydrophobic Surface Prepared With a Sol-Gel Method Based on Alumina Nanoparticles, 2008, Journal of Adhesion Science and Technology, vol. 22, pp. 311-318. (Year: 2008).*
Machine translation of JP57-180812, published Nov. 1982. (Year: 1982).*
Partial English translation of JP57-180812, published Nov. 1982. (Year: 1982).*
Office Action in CN Application No. 201480053317.X dated Dec. 1, 2016, 25 pages.
Extended European Search Report for European Application No. 14851072.0, dated May 17, 2017.
Search Report in International Application No. PCT/JP2014/076303 dated Jan. 6, 2015.

* cited by examiner

ALUMINUM-RESIN COMPOSITE, INSULATED ALUMINUM WIRE, FLAT CABLE AND PROCESSES FOR PRODUCING THE SAME

CROSS-REFERENCE TO RELATED APPLICATIONS

This is a continuation of International Patent Application No. PCT/JP2014/076303 filed Oct. 1, 2014, which claims the priority benefit of Japanese Patent Application No. 2013-208186 filed Oct. 3, 2013, the entire respective disclosures of which are incorporated herein by reference.

TECHNICAL FIELD

The present invention relates to an aluminum-resin composite used for an electronic device, a household electrical appliance, vehicle parts, vehicle-mounted articles, etc. Specifically, the present invention relates to a process for producing the aluminum-resin composite which is excellent in adhesive property between metal and resin and besides is applicable to a continuous production process such as a wire production process, and further relates to an insulated wire and a flat cable which are produced using this process.

BACKGROUND ART

In recent years, under the circumstances where the needs are ever-increasing for employing aluminum as a conductor in substitution for conventionally used copper for the purpose of avoiding a risk of a future steep price increase of copper, obtaining easiness in resource procurement and realizing a weight reduction intended particularly for a vehicle, the low adhesive force between aluminum and resin has become a major challenge. Specifically, since the adhesive force between aluminum and resin is low, when applying tension to a resin-coated aluminum wire in order to wind the aluminum wire, an interface fracture between aluminum and resin occurs to peel off an insulation coating of the resin. Therefore, such a problem has occurred that in order to wind the aluminum wire so as not to peel off the insulation coating, the resin-coated aluminum wire needed to be wound at low speed and with low tensile force and thereby its winding density became less dense.

Heretofore, as a method for improving adhesion between aluminum and resin, a method has been proposed (in a patent literature 1) in which after immersing aluminum into ammonia and hydrazine, thermoplastic resin such as polybutylene terephthalate resin is allowed to contact with a metal by an injection molding process. This method, however, is limited to the thermoplastic resin and further is limited to a contact method, between the metal and the resin, performed by the injection molding process. Accordingly, for a coating of thermosetting resin such as polyamideimide, polyimide, etc. which are formed by a baking process after coating a solution on a metal surface, a sufficient improvement in adhesive property between the coating and aluminum cannot be expected. Further, since an ammonia aqueous solution is strongly alkaline and the hydrazine is a carcinogenic material, a burden on the environment is high and hence the development of a more environment-friendly process has been required.

Further, as a method for improving the adhesion between resin and aluminum alloy, a method has been proposed (in a patent literature 2) in which a surface of aluminum is treated with a silane coupling agent having a functional group such as an epoxy group, an amino group or the like to allow phenol resin to contact with the treated surface of aluminum. This method, however, could not sufficiently exploit an innate characteristic of the silane coupling agent having an improvement effect of the adhesion since the wettability of the silane coupling agent is poor due to the hydrophobicity of the surface of aluminum.

Furthermore, as a method for improving the adhesion between aluminum and resin, a method has been proposed (in a patent literature 3) in which after forming a metallic compound coating on the surface of aluminum, an aluminum surface treatment is performed using a triazine thiol derivative for thermoplastic resin such as acrylonitrile-butadiene-styrene copolymer (ABS) resin, polyphenylene sulfide resin (PPS), nylon resin or the like. This method, however, requires a 15-minute treating time for forming the metallic compound coating and further a 50-minute long-haul treatment in a liquid immersion process and a thermal treatment process which are intended to treat the trizine thiol derivative. Therefore, this method is not applicable to a continuous treatment process required for the production of an insulated wire or a metallic wire, etc. and then is limited only to a batch production process, thus leading to highly inferior productivity.

Due to these problems, a method for improving the adhesion between aluminum and thermosetting resin such as polyamide-imide and polyimide or the like used for the electronic device, the household electrical appliance, the vehicle parts, the vehicle-mounted articles, etc., and thereby giving a high degree of the adhesion; or the development of a method for improving the adhesion applicable to the continuous process such as the wire and metal wire production processes; has been required.

Moreover, in order to improve the adhesive property between metal parts and thermoplastic resin parts, a method for processing a rough surface on a metal surface by laser so that an interval of adjacent rough surfaces becomes 250 μm or less and a depth of the unevenness forming the rough surface becomes 10 μm or more and 50 μm or less has been disclosed (in a patent literature 4). In this method, however, when using the thermosetting resin as substitute for the thermoplastic resin, since the production process includes thermal treatment, if the unevenness on the metal surface is large, when liquid thermosetting resin is coated on the metal surface, the air contained in the unevenness does not sufficiently get out. As a result, the residual air causes a large number of air bubbles to be generated at the time of a baking thermal process

CITATION LIST

Patent Literature

Patent literature 1: International unexamined patent application No. 03/064150

Patent literature 2: Japanese unexamined patent application publication No. 2009-126126

Patent literature 3: Japanese unexamined patent application publication No. 2011-052292

Patent literature 4: Japanese unexamined patent application publication No. 2013-111881

SUMMARY OF INVENTION

Technical Problem

It is an object of the present invention to provide a method for improving adhesion between a thermosetting insulating material such as polyamide-imide, polyimide, etc. and aluminum and thereby giving a high degree of the adhesion; an aluminum-resin composite which is excellent in adhesive property between metal and resin and is applicable to a continuous production process such as an wire production process in regard to the aluminum-resin composite used for an electronic device, a household electrical appliance, vehicle parts, vehicle-mounted articles, etc.; and an insulated wire and a flat cable which are produced using the above aluminum-resin composite.

Solution to Problem

In order to attain the above-mentioned object, the following inventions are provided.

(1) An aluminum-resin composite comprising;
a metal made of aluminum or an aluminum alloy, and
a resin adhering to the metal via an alumina nanoporous layer which is formed on a surface of the metal and contains alumina nanoparticles of 5 to 100 nm in average particle diameter,
wherein a ten-point average roughness Rz of the metal is 20 µm or less in an interface between the metal and the resin.

(2) An insulated aluminum wire comprising:
a metal wire made of aluminum or an aluminum alloy, and
an insulation coating for coating the metal wire via an alumina nanoporous layer which is formed on a surface of the metal wire and contains alumina nanoparticles of 5 to 100 nm in average particle diameter.

(3) An insulated aluminum wire comprising;
a metal wire made of aluminum or an aluminum alloy, and
an insulation coating for coating the metal wire via an alumina nanoporous layer formed on a surface of the metal wire,
wherein a ten-point average roughness Rz of the surface of the metal wire is 20 µm or less in an interface between the metal wire and the insulation coating.

(4) The aluminum-resin composite according to claim 1, wherein the resin is thermosetting resin containing at least one selected from a group including polyimide, polyamide-imide, polyesterimide, polyetherimide, polyimide hydantoin-modified polyester, formal, polyurethane, polyester, polyvinylformal, epoxy resin, phenol resin, and polyhydantoin.

(5) A flat cable comprising:
conductors made of aluminum or an aluminum alloy, and
a resin layer for sandwiching each of the conductors from both sides of each of the conductors via an alumina nanoporous layer formed on a surface of each of the conductors.

(6) A process for producing an aluminum-resin composite, comprising:
a process for forming an alumina nanoporous layer by irradiating a surface of a metal made of aluminum or an aluminum alloy with laser, and
a process for forming resin on the alumina nanoporous layer.

(7) A process for producing an insulated aluminum wire, comprising:
a process for forming an alumina nanoporous by irradiating a surface of a metal wire made of aluminum or an aluminum alloy with laser, and
a process for forming an insulation coating on the metal wire via the alumina nanoporous layer.

(8) A process for producing a flat cable, comprising:
a process for forming an alumina nanoporous layer by irradiating a surface of each of conductors made of aluminum or an aluminum alloy with laser, and
a process for forming a resin layer on each of the conductors via the alumina nanoporous layer.

Advantageous Effects of Invention

The present invention relates to the aluminum-resin composite and can enhance the adhesive property between metal and resin and besides can provide the aluminum-resin composite applicable to the continuous production process such as the wire production process, and further can provide a composite insulated wire and a flat cable which are produced by using the aluminum-resin composite, and the processes for producing these composite, wire and cable.

BRIEF DESCRIPTION OF DRAWINGS

FIG. 7 (a) is a scanning electron micrograph of a surface of aluminum after a laser surface treatment according to an embodiment 1 and FIG. 7 (b) is an enlarged microgram of FIG. 7 (a).

DESCRIPTION OF EMBODIMENTS

Hereunder is a detailed description of embodiments according to the present invention based on the drawings.

Figure 1:
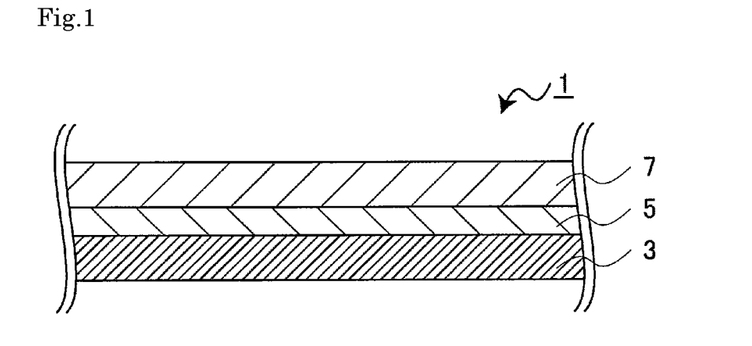
FIG. 1 is a cross-sectional view illustrating an aluminum-resin composite according to an embodiment of the present invention.
Figure 2:
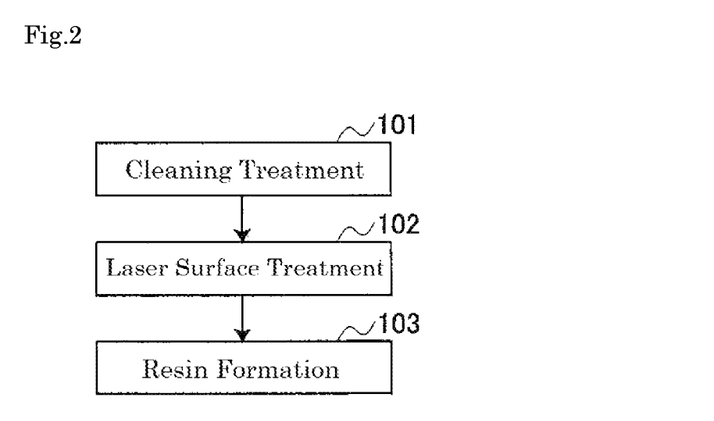
FIG. 2 is a flowchart illustrating a process for producing the aluminum-resin composite according to the embodiment of the present invention.

As shown in FIG. 1, an aluminum-resin composite 1 includes a metal 3, and resin 7 provided on an alumina nanoporous layer 5 provided on a surface of the metal 3. The metal 3 is made of aluminum or an aluminum alloy. The alumina nanoporous layer 5 is an alumina nanoporous layer containing alumina nanoparticles. Further, as the resin 7, a resin having an insulation property is desirable and further thermosetting resin is desirable depending on its purpose of use. The aluminum-resin composite 1 is, as shown in FIG. 2, formed mainly by undergoing three processes of a cleaning treatment process 101, a laser surface treatment process 102, and a resin formation process 103. Each process is explained below.

<Cleaning Treatment>

In some cases, the surface of the metal 3 made of aluminum or the aluminum alloy becomes uneven due to segregation and an oxide layer which are caused in a production process and is contaminated due to the adherence of rolling-mill lubricant, machining oil, press oil, etc. used in machining and forming, the generation of rust, and the attachment of finger patterns, etc. in carrying the metal 3.

Accordingly, a cleaning treatment is desirably performed using an appropriate cleaning method depending on a condition of the surface of the metal. However, since the contaminants are removed by a laser processing, applied to the surface of aluminum, which is to be carried out in the following process, the cleaning treatment of the surface of the metal prior to the laser processing is judged to be optional.

As the cleaning method, physical methods including grinding, buffing, shot blast or the like, an electrochemical method where an electrolytic process is practiced in, e.g., an alkaline degreasing solution and the cleaning is performed utilizing hydrogen and oxygen which are generated, and a chemical method performed by an alkaline solvent medium (detergent) are cited, and thereafter a post-treatment is desirably implemented by acidic liquid as a neutralizing process. Besides, a dry processing such as a UV-ozone process and a plasma processing can be used.

<Laser Surface Treatment>

A metal surface treatment by laser used in the present invention is based on a laser ablation technique. The laser ablation means a process in which when irradiating solid matter with laser light, if the irradiation intensity of the laser light exceeds a certain level (threshold), the laser light is converted into electronic, thermal, photochemical and dynamic (mechanical) energies and as a result, neutral atoms, molecules, positive and negative ions, radicals, clusters, electrons, and light (photons) are explosively released to etch a surface of the solid matter. Specifically, when irradiating the surface of the metal with the laser light, the laser light is absorbed by the solid matter and free electrons, ions and atoms are released via various elementary steps. Particles thus released absorb the laser light to produce high-temperature plasma and release a large amount of particles from the solid matter. A group of these particles are scattered by free expansion if an ambient atmosphere is vacuum, while if the ambient atmosphere is gaseous, the group expands while repeating collision and reaction. Some of the released particles interact with an atmospheric gas and as a result, attach again to an ablated surface of the solid matter. These residua are referred to as debris and have become a major issue as a contaminant in a fine processing of the surface of the solid matter (cited from a book of "Laser Ablation and its Applications" edited by Investigating R&D Committee on Industrial Applications of Laser Ablation in the Institute of Electrical Engineers, published by Corona Publishing Co., Ltd. in 1999).

The present invention is characterized in that re-adhered particles that have been conventionally the issue of the laser ablation are utilized to form, on the surface of aluminum, a nanoporous layer containing nanoparticles and thereby remarkably improve the adhesive property between metal and resin.

A mechanism of the improvement in the adhesive property between metal and resin can be considered as described below. The nanoparticles ejected during the ablation re-adhere to the surface and then a porous layer containing these nanoparticles is formed on the surface. When coating liquid thermosetting resin on the layer, the resin gains entrance into nanospaces of the nanoporous layer with no space left in the nanoporous layer. Then, when baking the resin, innumerable nanoscale anchors are formed in the interface between metal and resin and thereby the adhesive property is remarkably improved.

In order to make the nanoparticles easy to re-adhere, the pressure of the atmosphere is desirably increased and therefore the laser process is desirably performed within the atmosphere of a high-density gas such as the atmospheric air or argon.

<Nanoporous Layer>

The thickness of the nanoporous layer formed on the surface of the metal by the re-adhering of the nanoparticles is not particularly limited. However, a 5 to 1,000 nm thick nanoporous layer is recommendable and further the nanoporous layer is desirably 10 to 500 nm in thickness. Thickness of 5 nm or less makes it impossible to expect the effect of the present invention, while in order to form the 1,000 nm thick nanoporous layer, a prolonged laser surface treatment is required to make it difficult to perform a continuous treatment process and besides even if the nanoporous layer becomes 1,000 nm or more in thickness, it is considered that an anchor effect is unlikely to increase. Further, the alumina nanoparticle that re-adheres is on the order of 5 to 100 nm in average particle diameter and is desirably on the order of 10 to 50 nm in the same. The nanoporous layer is mainly made up of the alumina nanoparticles of 5 to 100 nm in average particle diameter. In the nanoporous layer, however, particles other than the alumina nanoparticles of 5 to 100 nm in average particle diameter are likely to get mixed in the nanoporous layer as impurity and by-product. Among particles making up the nanoporous layer, 50% or more particles in number and desirably 80% or more particles in number are the alumina nanoparticles of 5 to 100 nm in average particle diameter. Besides, the particles are not densely stacked and adhere together with air gaps left and hence holes three-dimensionally communicating with one another are formed in the nanoporous layer.

The laser light used for the laser surface treatment is not particularly limited. However, gas laser such as excimer laser used for ablation and $CO_2$ laser, etc., solid-state laser such as YAG, etc., and fiber laser are desirable. The solid-state laser and the fiber laser are more desirable since it is effective to use a short pulse light by which a high peak output can be obtained by concentrating energy into a shorter time length. As short-pulse light, it is effective to use nanosecond to femtosecond pulse light and further it is more effective to use picosecond to femtosecond pulse light.

When irradiating solid matter with laser light, the irradiation intensity of the laser light needs to become more than a certain value (threshold) in order to release particles, and as its parameter, a laser light intensity (an energy quantity per unit area and per unit time) needs to be controlled and therefore it is desirable that the intensity is, e.g., $10^9$ W/cm$^2$ or more. When intensifying further the laser light intensity, a surface processing speed of laser increases to become desirable for the continuous process and therefore the intensity of $10^{10}$ W/cm$^2$ or more is desirable and further the intensity not less than $10^{11}$ W/cm$^2$ is more desirable.

However, if the laser light intensity is too high, the laser ablation makes excessive progress and thereby the unevenness on the macroscale surface of the metal becomes large, so that the unevenness of 10 to 50 μm is formed on the surface of the metal as is done in the patent literature 4. If the unevenness becomes large, when the liquid thermosetting resin is coated on the surface of the metal, the air within the unevenness does not sufficiently get out and as a result, a large number of air bubbles are caused to arise in a baking process.

Further, if a processing speed per unit area (mm$^2$/sec) which is controllable by a laser scanning speed decreases, the unevenness becomes large by the progress of ablation. As a result, the continuous working process becomes more difficult and thereby the processing speed is desirably 100 mm²/sec or more and is more desirably 1,000 mm²/sec or more.

Figure 6:
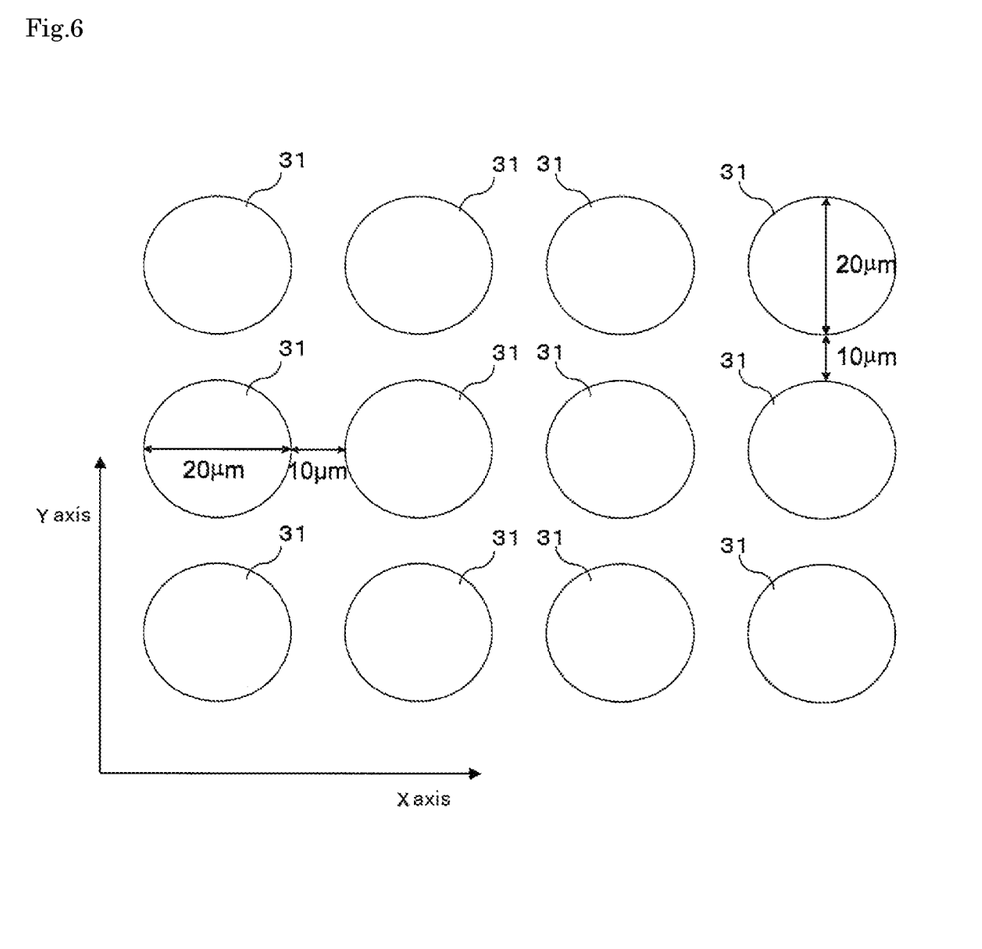
FIG. 6 is an explanatory drawing of a beam spot position when applying a laser processing to part of a surface of a metal in embodiments 12 to 14.

Furthermore, as a laser scanning method, other than a method for carrying out a scanning operation at a constant speed to irradiate a whole area of a metal with laser, such a method is also possible that laser is radiated to only part of the metal for the purpose of increasing the laser processing speed. As a method for radiating laser only to part of a sample, e.g., a method for radiating laser in any one of a longitudinal direction (X) and a direction (Y) vertical to the longitudinal direction or a method for radiating laser in both the X and Y directions at regular intervals as shown in FIG. 6 are cited. When irradiating the surface of the metal with laser, the nanoparticles are scattered up to a peripheral place of a beam spot to form the nanoporous layer containing the nanoparticles and hence even when laser is radiated only to part of the surface of the metal, the improvement effect in adhesion can be expected.

By controlling the above laser light intensity and laser processing speed in consideration of a resin viscosity, a standing time elapsing from resin coating to the baking process, etc., an unevenness level (the ten-point average roughness Rz) is desirably regulated so as to become, e.g., 20 μm or less, more desirably 10 μm or less, and furthermore desirably 5 μm or less. In an aluminum material, according to the present invention, which has undergone the laser surface treatment, even if the unevenness is 5 μm or less, an extremely high adhesive property between the aluminum material and the thermosetting resin can be obtained by a nano-anchor effect derived from the nanoporous layer formed on the surface, and therefore it can be said that the present invention is an exceedingly effective method for improving the adhesive property between a metal and the thermosetting resin. Further, as described above, if the unevenness is overlarge, the air within the unevenness does not sufficiently get out when the liquid thermosetting resin is coated on the surface of the metal and as a result, the large number of air bubbles is caused to arise As a method for verifying macroscopically the unevenness level of the surface of the metal formed by the laser process, e.g., an analyzing method performed by a laser microscope is cited. Further, as a method for performing micro-level detailed observation, a cross section is processed by means of an Ar ion milling method, and then the interface between metal and resin can be verified by a scanning electron microscope (SEM).

In addition, the ten-point average roughness Rz determines a sum of an average value obtained by averaging a total of five peak values from the highest peak value to the fifth-highest peak value and average value obtained by averaging a total of five depth values from a depth value in the deepest bottom of the valley to a depth value in the fifth-deepest bottom of the valley, in a roughness curve of a reference length. Therefore, the ten-point average roughness Rz does not reflect a nano-level minute unevenness formed by the nanoparticles making up the nanoporous layer but reflects a macro unevenness. Accordingly, the ten-point average roughness Rz is particularly unchanged by the presence and absence of the nanoporous layer and hence even after the nanoporous layer is formed, the macro unevenness on the surface can be evaluated.

<Resin Formation>

In the present invention, the resin having thermal resistance and further an insulation property depending on the intended use is desirable for the thermosetting resin used for a resin material. For example, such resins are usable as polyimide, polyamide-imide, polyesterimide, polyetherimide, polyimide hydantoin-modified polyester, formal, polyurethane, polyester, polyvinylformal, epoxy resin, phenol resin, and polyhydantoin. Desirably, polyimide-based resin such as polyimide, polyamideimide, polyetherimide, and polyimide hydantoin-modified polyester which are excellent in thermal resistance can be used. Among these resins, one resin may be used and further two or more resins may be mixed to be used.

Further, the same improvement effect in adhesive property can be expected even for liquid resin such as UV curing resin, etc.

<Insulated Aluminum Wire>

Figure 3:
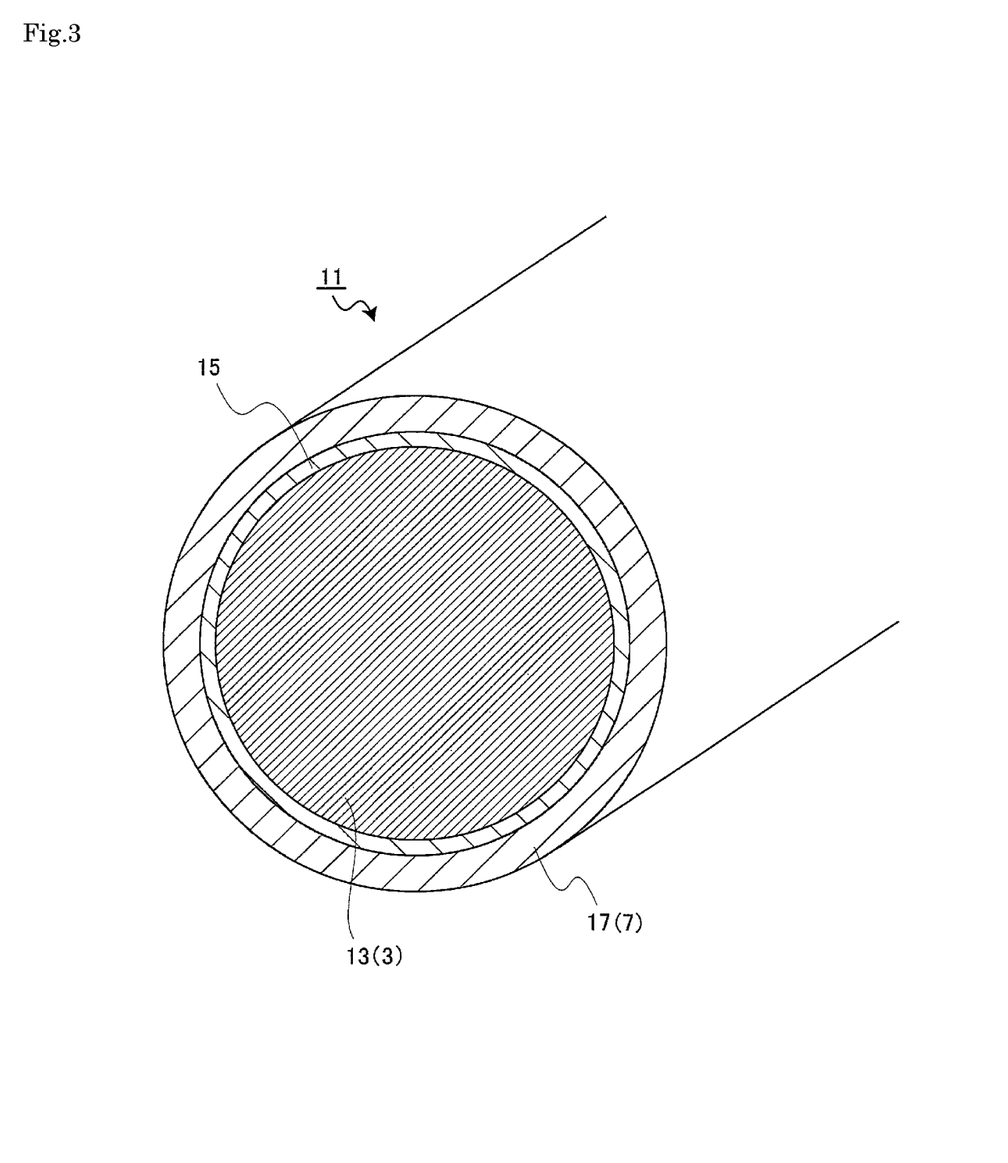
FIG. 3 is a cross-sectional view illustrating an insulated aluminum wire 11 according to an embodiment of the present invention.

The aluminum-resin composite according to the embodiment of the present invention can be used as an insulated aluminum wire. As shown in FIG. 3, the insulated aluminum wire 11 includes a metal wire 13 made of aluminum or an aluminum alloy and an insulation coating 17 for coating the metal wire 13 via a nanoporous layer 15 formed on a surface of the metal wire 13. Specifically, in an interface between the metal wire 13 and the insulation coating 17, the insulated aluminum wire 11 has a stacked structure the same as that of the aluminum-resin composite 1, according to the embodiment of the present invention, which is composed of the metal 3, the alumina nanoporous layer 5, and the resin 7. The metal wire 13 corresponds to the metal 3, the nanoporous layer 15 does to the nanoporous layer 5, and the insulation coating 17 does to the resin 7 and thus the same materials can be used. The insulated aluminum wire 11 like this is wound to make a coil. Since being excellent in the adhesive property between the metal wire 13 and the insulation coating 17, the insulated aluminum wire 11 can be wound with high tension and at a high rotating speed to enable a high-winding-density coil to be obtained with high productivity.

<Flat Cable>

Figure 4:
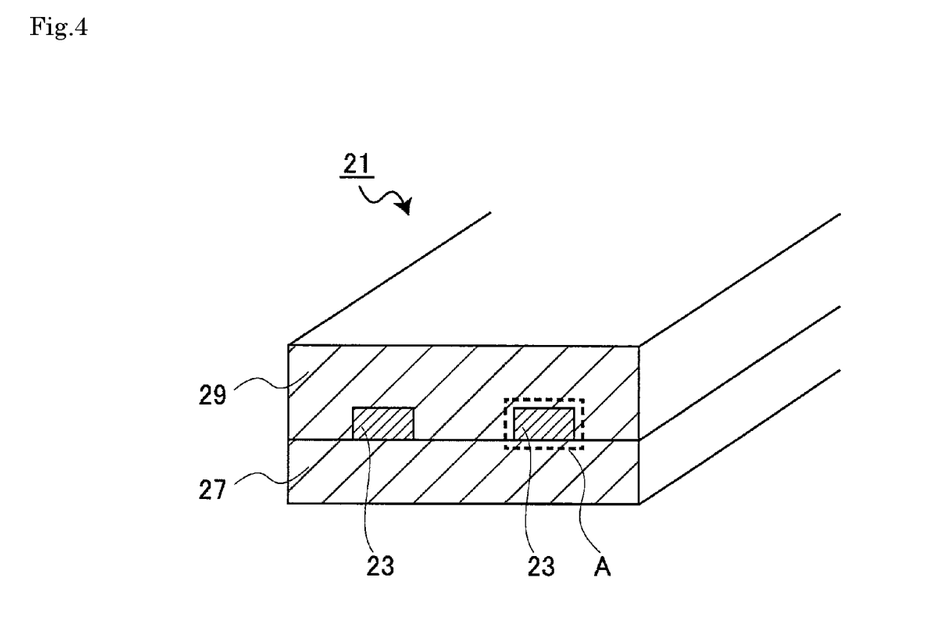
FIG. 4 is a cross-sectional view illustrating a flat cable 21 according to an embodiment of the present invention.
Figure 5:
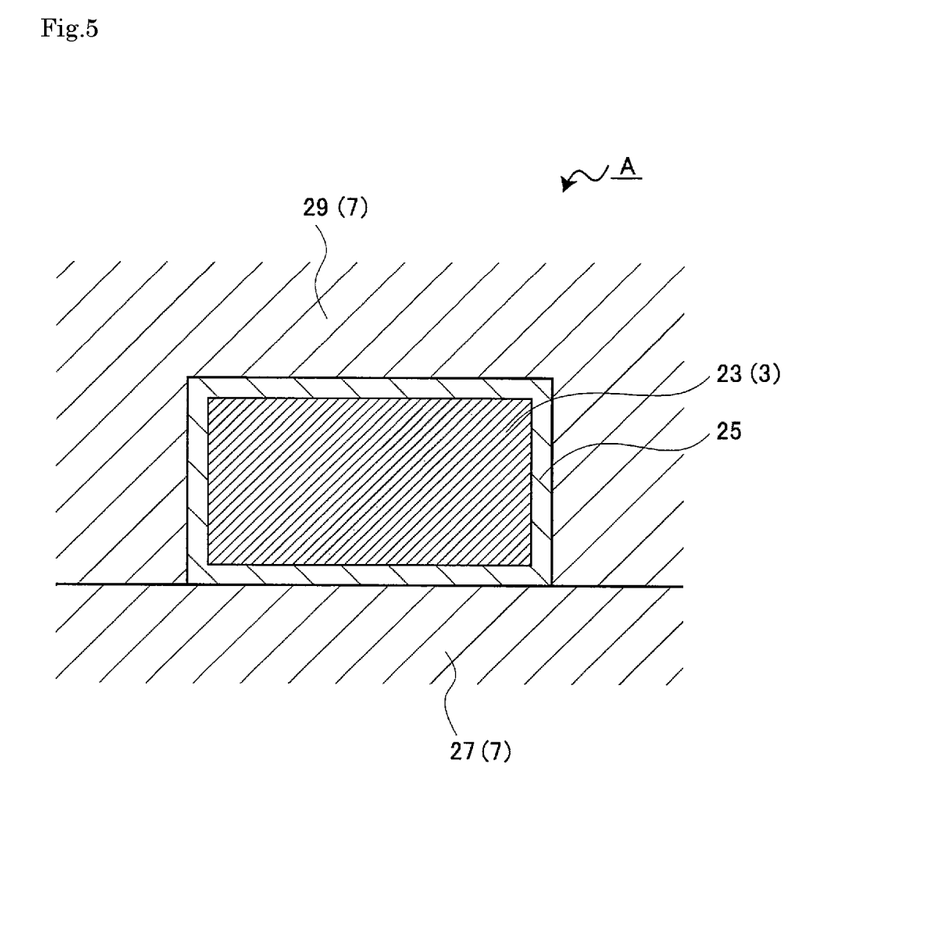
FIG. 5 is an enlarged view of an A portion in FIG. 4.

A flat cable 21 according to the embodiment of the present invention has a structure, as shown in FIG. 4, where each of conductors 23, made of aluminum or an aluminum alloy, which is sandwiched by a resin layer 27 and a resin layer 29 from both sides of each of the conductors. FIG. 5 is an enlarged view of a portion A in FIG. 4. As shown in FIG. 5, the flat cable 21 includes the conductors 23 made of aluminum or the aluminum alloy and the resin layers 27, 29 for sandwiching the conductors 23 from both the sides thereof via a nanoporous layer 25 formed on a surface of each of the conductors 23. Specifically, in an interface between the conductor 23 and the resin 27 or the resin 29, the flat cable 21 has a stacked structure the same as that of the aluminum-resin composite 1, according to the embodiment of the present invention, which is composed of the metal 3, the alumina nanoporous layer 5, and the resin 7. The conductor 23 corresponds to the metal 3, the nanoporous layer 25 does to the nanoporous layer 5, and each of the resin layers 27, 29 does to the resin layer 7 and thus the same materials can be used. The flat cable 21 like this can be used for an interconnecting wire of an electric machine, etc. The flat cable 21 is excellent in the adhesive property between the conductors 23 and the resin layers 27, 29 and therefore even if repeating a bending action thereof, the peeling between the conductors 23 and the resin layers 27, 29 is not generated.

<Effects according to the Present Embodiment>

The mechanism of the improvement in the adhesive property between metal and resin is that the nanoparticles ejected during the laser ablation re-adhere to a surface of the metal and at the time, the nanoporous layer containing these nanoparticles is formed on the surface. Then, it is considered that when the liquid thermosetting resin is coated on the nanoporous layer, the thermosetting resin gains entrance into nanospaces in the nanoporous layer with no space left therein and afterward when applying the baking process, nanoscale innumerable anchors are formed in the interface between metal and resin and thereby the adhesive force between the metal 3 and the resin 7 is exceedingly improved.

Further, the process for producing the aluminum-resin composite in the present embodiment can be done in a shorter amount of time as compared with the time conventionally taken and therefore is applicable to the continuous production process such as a wire production process.

EMBODIMENTS

Next is a detailed description on embodiments and comparative examples for the sake of further clarifying the effects of the present invention. The present invention is, however, not limited to these embodiments.

Embodiment 1

1. Aluminum Surface Treatment

A sample (size=3 mm×120 mm) of an aluminum alloy (AIN30H, thickness is 100 µm) was used and the surface treatment was done in the following order.

1-1 Degreasing and Acid Cleaning Treatment (1) Degreasing Treatment: In a sodium hydroxide solution (10 g/L, room temperature, 400 A/m$^2$), the aluminum alloy was immersed for 30 sec.

(2) Water Cleaning: In ion-exchange water (resistivity=18.0 Ω·cm, Millipore Corp.), the aluminum alloy was immersed for 30 sec.

(3) Neutralizing (Acid) Treatment: In nitric acid (100 g/L), the aluminum alloy was immersed for 30 sec.

(4) Water Cleaning; In the ion-exchange water, the aluminum alloy was immersed for 30 sec.

1-2 Laser Surface Treatment

Using a solid-state laser system (YMG pulse laser, a central wavelength=515 nm, a pulse width=0.9 psec) made by Hamamatsu Photonics K.K., the laser processing in the atmosphere was performed under the condition that pulse energy was 90 µJ, a pulse repetition frequency was 40 kHz, a beam spot was 66 µm, laser light intensity was $2.9 \times 10^{12}$ W/cm$^2$, a laser scanning speed was 2 mm/sec in the longitudinal direction (X), 1,600 mm/sec in the direction (Y) vertical to the longitudinal direction (X), and a processing speed was 3,200 mm$^2$/sec.

Figure 7A:
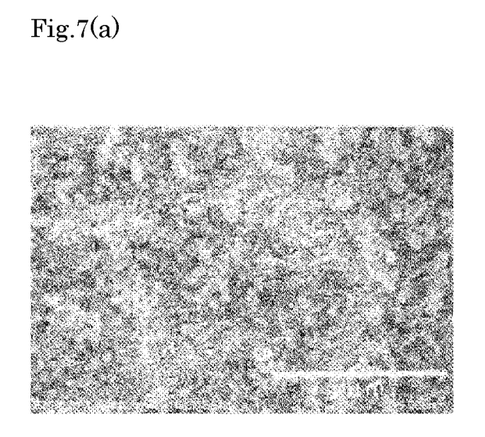
Figure 7B:
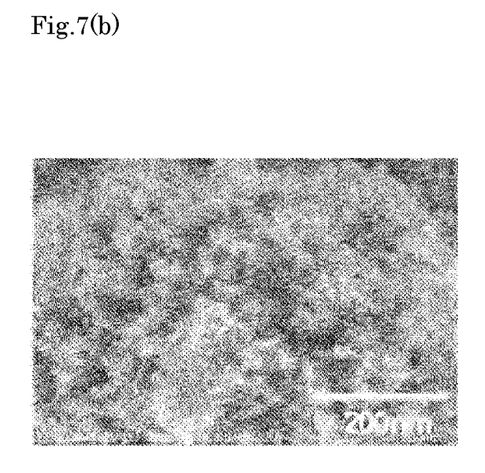
Figure 8:
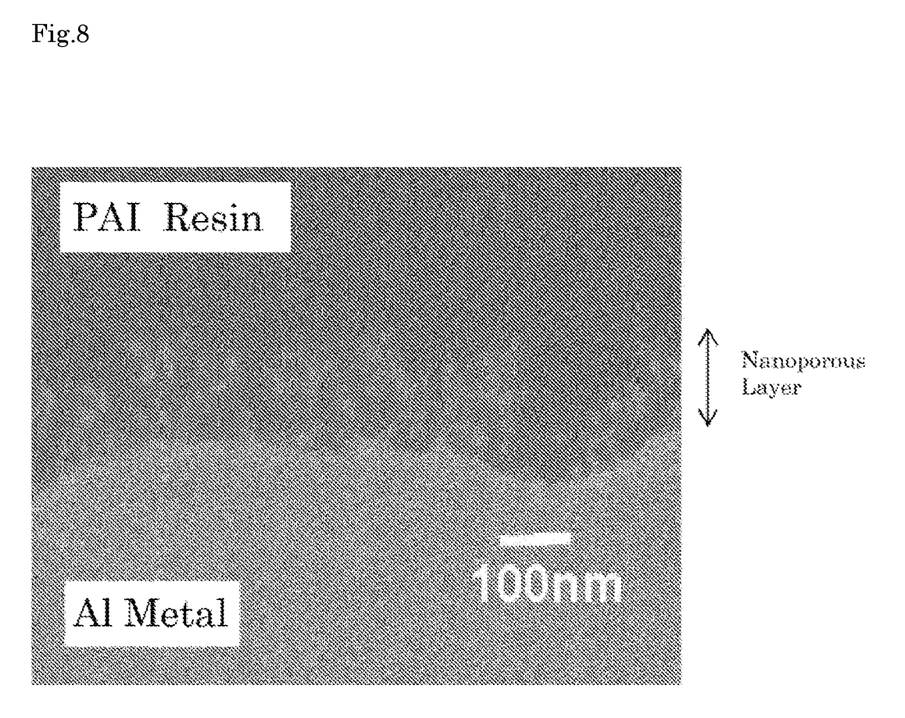
FIG. 8 is a cross-sectional photograph of an interface between an aluminum metal and polyamide-imide resin.

As a result, as shown in FIG. 7(a), the formation of the fine unevenness could be verified by an electronic microscope and thus it was learnt in an enlarged photograph shown in FIG. 7(b) that the nanoporous layer, which was made up of alumina nanoparticles of 10 nm and had holes three-dimensionally communicating with one another, was formed on the surface.

In order to verify the micro-level surface unevenness, using a laser microscope (VK-X200 made by KEYENCE Corporation) and a lens of 150 magnification and further using an observed photography of the surface of aluminum and an image analysis application (Ver. 3.2.0.0 made by KEYENCE Corporation), a value of the ten-point average roughness Rz was measured.

2. Resin Formation on Surface of Aluminum

Using a coater, polyamideimide (PAI, H1406SA) resin was uniformly coated (resin thickness=about 30 µm) on the surface of aluminum treated as described above. Afterward, by applying a thermal treatment at 150 degrees C., 200 degrees C. and 250 degrees C. for 20 minutes for each of the temperatures, the baking process was applied to the resin on the surface of the metal. As a result, such an aspect could be verified that the resin gained entrance into the nanoporous layer made up of nanoparticles of about 10 µm with no space therein.

Embodiment 2

A test piece was made in the same fashion as in the embodiment 1 except that the laser processing condition was changed into one where the beam spot was 150 µm and the laser light intensity was $5.7 \times 10^{11}$ W/cm$^2$.

Embodiment 3

A test piece was made in the same fashion as in the embodiment 1 except that the laser processing condition was changed into one where the beam spot was 300 µm and the laser light intensity was $1.4 \times 10^{11}$ W/cm$^2$.

Embodiment 4

A test piece was made in the same fashion as in the embodiment 1 except that the laser processing condition was changed into one where the laser scanning speed was 10,000 mm/sec in the direction (Y) vertical to the longitudinal direction and the processing speed was 20,000 mm$^2$/sec.

Embodiment 5

A test piece was made in the same fashion as in the embodiment 1 except that the laser processing condition was changed into one where the laser scanning speed was 10 mm/sec in the longitudinal direction (X) and 10,000 mm/sec in the direction (Y) vertical to the longitudinal direction and the processing speed was 100,000 mm$^2$/sec.

Embodiment 6

A test piece was made in the same fashion as in the embodiment 1 except that the laser processing condition was changed into one where the beam spot was 300 µm, the laser light intensity was $1.4 \times 10^{11}$ W/cm$^2$, the laser scanning speed was 10,000 mm/sec in the direction (Y) vertical to the longitudinal direction, and the processing speed was 20,000 mm$^2$/sec.

Embodiment 7

As a cleaning treatment prior to the laser processing, a test piece was made in the same fashion as in the embodiment 1 except that a UV-ozone generator (made by SEN LIGHTS CORPORATION, PL17-110, UV lump=189.9 nm, 253.7 nm) was used to perform the cleaning treatment for 3 minutes.

Comparative Example 1

As is the case with the embodiment 1, only the degreasing and acid cleaning treatments were performed to make a test piece without performing the laser processing.

Comparative Example 2

As is the case with the embodiment 7, only the cleaning treatment was performed by the UV-ozone device without performing the laser processing to make a test piece.

Embodiment 8

A test piece was made in the same fashion as in the embodiment 1 except the condition that the pulse energy was 150 µJ, the pulse repetition frequency was 20 kHz, the laser light intensity was $4.9 \times 10^{12}$ W/cm$^2$, the laser scanning speed was 1 mm/sec in the longitudinal direction (X) and 3,200 mm/sec in the direction (Y) vertical to the longitudinal direction, and the processing speed was 3,200 mm$^2$/sec.

Embodiment 9

A test piece was made in the same fashion as in the embodiment 1 except the condition that the pulse energy was 150 µJ, the pulse repetition frequency was 20 kHz, the beam spot was 145 µm, the laser light intensity was $1.0 \times 10^{12}$ W/cm$^2$, the laser scanning speed was 0.125 mm/sec in the longitudinal direction (X), and the processing speed was 200 mm$^2$/sec.

Embodiment 10

A test piece was made in the same fashion as in the embodiment 1 except the condition that the pulse energy was 150 µJ, the pulse repetition frequency was 20 kHz, the beam spot was 460 µm, the laser light intensity was $1.0 \times 10^{11}$ W/cm$^2$, the laser scanning speed was 0.042 mm/sec in the longitudinal direction (X), and the processing speed was 67 mm$^2$/sec.

Embodiment 11

A test piece was made in the same fashion as in the embodiment 1 except the condition that the pulse energy was 150 µJ, the pulse repetition frequency was 20 kHz, the beam spot was 125 µm, the laser light intensity was $1.4 \times 10^{12}$ W/cm$^2$, the laser scanning speed was 0.025 mm/sec in the longitudinal direction (X), and the processing speed was 40 mm$^2$/sec.

Comparative Example 3

A test piece was made in the same fashion as in the embodiment 1 except the condition that the pulse energy was 150 µJ, the pulse repetition frequency was 20 kHz, the beam spot was 250 µm, the laser light intensity was $3.4 \times 10^{11}$ W/cm$^2$, the laser scanning speed was 0.025 mm/sec in the longitudinal direction (X), and the processing speed was 40 mm$^2$/sec.

Embodiment 12

A test piece was made in the same fashion as in the embodiment 1 except the condition that a solid laser generator made by Coherent Inc. (YAG pulse laser: the central wavelength was 532 nm, and the pulse width=600 psec) was used, the pulse energy was 23.2 µJ, the pulse repletion frequency was 50 kHz, the beam spot was 20 µm, the laser light intensity was $1.2 \times 10^{10}$ W/cm$^2$, and the processing speed was 20 mm$^2$/sec, and the beam spot 31 was arranged at a 30 µm pitch in the longitudinal direction and in the direction (Y) vertical to the longitudinal direction, and the beam spots 31 were arranged at a 30 µm pitch in the direction (Y) vertical to the longitudinal direction (X) as shown in FIG. 6 to perform the laser processing for part of the surface of the metal.

Embodiment 13

A test piece was made in the same fashion as in the embodiment 1 except the condition that a solid laser generator made by Coherent Inc. (YAG pulse laser: the central wavelength=532 nm and the pulse width=600 psec) was used, the pulse energy was 11.4 µJ, the pulse repletion frequency was 50 kHz, the beam spot was 18 µm, the laser light intensity was $7.5 \times 10^9$ W/cm$^2$, and the processing speed was 20 mm$^2$/sec, and the beam spots 31 were arranged at a 30 µm pitch in both the longitudinal direction (X) and in the direction (Y) vertical to the longitudinal direction (X), as shown in FIG. 6 to perform the laser processing for part of the surface of the metal.

Embodiment 14

A test piece was made in the same fashion as in the embodiment 1 except the condition that a solid laser generator made by Coherent Inc. (YAG pulse laser: the central wavelength=532 nm and the pulse width=600 psec) was used, the pulse energy was 5.8 µJ, the pulse repetition frequency was 50 kHz, the beam spot was 15 µm, the laser light intensity was $5.5 \times 10^9$ W/cm$^2$, and the processing speed was 20 mm$^2$/sec, and the beam spots 31 were arranged at a 30 µm pitch in both the longitudinal direction (X) and in the direction (Y) vertical to the longitudinal direction as shown in FIG. 6 to perform the laser processing for part of the surface of the metal.

Evaluation of Adhesive Force of Test Piece

For the evaluation of the adhesive force between metal and resin, a 90-degree peeling test was carried out. The resin was pulled at a peeling speed of 10 mm/min. (Shimadzu Autograph, AG-10kNI) and the adhesive force was evaluated by measuring stress generated at the time of the pulling. The test results were shown in tables.

TABLE 1

|  | Embodiment 1 | Embodiment 2 | Embodiment 3 | Embodiment 4 | Embodiment 5 | Embodiment 6 | Embodiment 7 | Comparative Example 1 | Comparative Example 2 |
|---|---|---|---|---|---|---|---|---|---|
| Type of Metal | Aluminum | | | | | | | | |
| Pretreatment | Degreasing and Acidizing | | | | | | UV, 180 sec | Degreasing and Acidizing | UV, 180 sec |
| Pulse Energy (µJ) | | | | 90 | | | | — | — |
| Pulse Repitition Frequency (kHz) | | | | 40 | | | | — | — |

TABLE 1-continued

| | Embodiment 1 | Embodiment 2 | Embodiment 3 | Embodiment 4 | Embodiment 5 | Embodiment 6 | Embodiment 7 | Comparative Example 1 | Comparative Example 2 |
|---|---|---|---|---|---|---|---|---|---|
| Central Wavelength (nm) | | | | 515 | | | | — | — |
| Pulse Width (psec) | | | | 0.9 | | | | — | — |
| Beam Spot (μm) | 66 | 150 | 300 | 66 | 66 | 300 | 66 | — | — |
| Laser Intensity (W/cm$^2$) | $2.9 \times 10^{12}$ | $5.7 \times 10^{11}$ | $1.4 \times 10^{11}$ | $2.9 \times 10^{12}$ | $2.9 \times 10^{12}$ | $1.4 \times 10^{11}$ | $2.9 \times 10^{12}$ | | |
| X Scanning Speed (mm/sec) | | 2 | | 2 | 10 | 2 | 2 | — | — |
| Y Scanning Speed (mm/sec) | | 1,600 | | 10,000 | 10,000 | 10,000 | 1,600 | — | — |
| Processing Speed (mm$^2$/sec) | 3,200 | 3,200 | 3,200 | 20,000 | 100,000 | 20,000 | 3,200 | | |
| Rz (μm) | 5.1 | 2.6 | 1.4 | 4.7 | 3.5 | 1.5 | 5.4 | 1.0 | 1.1 |
| Nanoporous Layer on Meatl Surface | Present | Present | Present | Present | Present | Present | Present | Absent | Absent |
| Adhesive Force (N/m) | Unpeelable | Unpeelable | 888 | Unpeelable | Unpeelable | 402 | Unpeelable | 190 | 95 |
| Foam Formation after Baking | not found | not found | not found | not found | not found | not found | not found | not found | not found |

TABLE 2

| | Embodoment 8 | Embodoment 9 | Embodoment 10 | Embodoment 11 | Comparative Example 3 |
|---|---|---|---|---|---|
| Type of Metal | | | Aluminum | | |
| Pretreatment | | | Degreasing and Acidizing | | |
| Pulse Energy (μJ) | | | 150 | | |
| Pulse Repetition Frequency (kHz) | | | 20 | | |
| Central Wavelength (nm) | | | 515 | | |
| Pulse Width (psec) | | | 0.9 | | |
| Beam Spot (μm) | 66 | 145 | 460 | 125 | 250 |
| Laser Intensity (W/cm$^2$) | $4.9 \times 10^{12}$ | $1.0 \times 10^{12}$ | $1.0 \times 10^{11}$ | $1.4 \times 10^{12}$ | $3.4 \times 10^{11}$ |
| X Scanning Speed (mm/sec) | 1 | 0.125 | 0.042 | 0.025 | 0.025 |
| Y Scanning Speed (mm/sec) | 3,200 | 1,600 | 1,600 | 1,600 | 1,600 |
| Processing Speed (mm$^2$/sec) | 3,200 | 200 | 67 | 40 | 40 |
| Rz (μm) | 5.8 | 4.0 | 2.1 | 19.5 | 37.0 |
| Nanoporous Layer on Metal Surface | Present | Present | Present | Present | Present |
| Adhesive Force (N/m) | Unpeelable | Unpeelable | Unpeelable | Unpeelable | Unpeelable |
| Foam Formation after Baking | not found | not found | not found | not found | found |

TABLE 3

| | Embdiment12 | Embodiment13 | Embodiment14 |
|---|---|---|---|
| Type of Metal | | Aluminum | |
| Pretreatment | | Degreasing and Acidizing | |
| Pulse Energy (μJ) | 23.2 | 11.4 | 5.8 |
| Pulse Repetition Frequency (kHz) | | 50 | |
| Central Wavelength (nm) | | 532 | |
| Pulse Width (psec) | | 600 | |
| Beam Spot (μm) | 20 | 18 | 15 |
| Laser Intensity (W/cm$^2$) | $1.23 \times 10^{10}$ | $7.47 \times 10^{9}$ | $5.47 \times 10^{9}$ |
| Pitch Condition in X direction (μm) | | 30 | |
| Pitch Condition in Y direction (μm) | | 30 | |
| Rz (μm) | 2.7 | 3.7 | 3.1 |
| Nanoporous Layer on Metal Surface | Present | Present | Present |
| Adhesive Force (N/m) | Unpeelable | 670 | 388 |
| Foam Formation after Baking | not found | not found | not found |

As is clear from a Table 1, the laser intensity was allowed to change in the embodiment 1 to the embodiment 3 and then the processing was performed, and as a result, the adhesive force of 888 N/m or more was obtained. Further, as shown in the embodiment 4 to the embodiment 6, even in the case of changing the processing speed to perform the laser processing, the adhesive force of 402 N/m or more could be verified. Furthermore, even in the embodiment 7 where the preprocessing was changed into the UV-processing and thereafter the laser surface treatment was performed, it could be verified that the unpeelably-high adhesive property was developed. As described above, in comparison with comparative examples 1, 2 where the laser processing was omitted, it could be verified that clearly high the adhesive property has developed.

On the other hand, in the embodiment 8 where the laser intensity was increased, the unevenness (Rz) was enlarged as compared with that of the embodiment 1. Further, in the embodiment 9 to the embodiment 11 and the comparative example 3 where the laser processing speed was decreased, the unevenness was enlarged depending on the laser intensity and the processing speed. When the unevenness was excessively large as in the comparative example 3, it could be verified that air bubbles of the resin were generated after the baking process.

Further, as shown in the embodiment 12 to the embodiment 14, even when only part of the sample was irradiated with laser, the adhesive force of 388 N/m or more could be verified.

Furthermore, as shown in a Table 4, in the consequence of observing, by SEM, a cross section, subjected to an ion milling process, of the metal-resin interface of the metal-resin composite in each embodiment, the nanoporous layers of 50 nm to 350 nm in thickness could be verified.

TABLE 4

|  | Embodiment 1 | Embodiment 3 | Embodiment 12 | Comparative Example 1 |
|---|---|---|---|---|
| Thcikness of Nanoporous Layer (nm) | 100-300 | 50-350 | 50-200 | Absent |

From the above result, by regulating the laser intensity and the laser processing speed, the adhesive property between metal and resin could be enhanced and besides an excellent resin surface after the baking process could be obtained.

As described above, the preferred embodiments of the present invention are described. The present invention is, however, not limited to these embodiments. Those skilled in the art can clearly make the various alternative embodiments and various modifications within the scope of the technical idea disclosed in the present invention. Therefore, even these alternative embodiments and modifications justifiably can be understood to belong to the technical scope of the present invention.

REFERENCE SIGNS LIST 1 aluminum-resin composite
3 metal
5 nanoporous layer
7 resin
11 insulated aluminum wire
13 metal wire
15 nanoporous layer
17 insulation coating
21 flat cable
23 conductor
25 nanoporous layer
27 resin layer
29 resin layer
31 beam spot

The invention claimed is:

1. An aluminum-resin composite comprising:
a metal made of aluminum or an aluminum alloy, and
a thermosetting resin adhering directly to an alumina nanoporous layer which is formed directly on a surface of the metal and contains alumina nanoparticles of 10 nm to 50 nm in average particle diameter, wherein the alumina nanoporous layer is formed by ablating the surface of the metal with laser radiation to form the nanoparticles adhered to the surface of the metal with nanospaces formed between the nanoparticles, wherein the thermosetting resin fills the nanospaces, and wherein a ten-point average roughness Rz of the surface of the metal is 2.1 µm to 10 µm in an interface between the metal and the thermosetting resin.

2. The aluminum-resin composite according to claim 1, wherein the thermosetting resin contains at least one selected from the group consisting of polyimide, polyamideimide, polyesterimide, polyetherimide, polyimide hydantoin-modified polyester, formal, polyurethane, polyester, polyvinylformal, epoxy resin, phenol resin, and polyhydantoin.

3. A process for producing the aluminum-resin composite as defined in claim 1, the process comprising the steps of:
forming the alumina nanoporous layer by ablating the surface of the metal with laser radiation to form the nanoparticles adhered to the surface of the metal with nanospaces formed between the nanoparticles, and
forming the thermosetting resin directly on the alumina nanoporous layer, wherein the resin fills the nanospaces.

4. An insulated aluminum wire comprising the aluminum-resin composite according to claim 1, wherein:
said metal made of aluminum or an aluminum alloy forms a metal wire, and
said thermosetting resin adheres directly to said alumina nanoporous layer formed on said surface of the metal to form an insulation coating for coating the metal wire.

5. A flat cable comprising the aluminum-resin composite according to claim 1, wherein:
said metal made of aluminum or an aluminum alloy forms metal conductors, and
said thermosetting resin adheres directly to said alumina nanoporous layer formed on the surface of each of the metal conductors to form a thermosetting resin layer for sandwiching each of the metal conductors from both sides of each of the metal conductors.

6. An insulated aluminum wire comprising:
a metal wire made of aluminum or an aluminum alloy, and
a thermosetting resin for coating the metal wire adhered directly to an alumina nanoporous layer which is formed directly on a surface of the metal wire and contains alumina nanoparticles of 10 nm to 50 nm in average particle diameter, wherein the alumina nanoporous layer is formed by ablating the surface of the metal with laser radiation to form nanoparticles adhered to the surface of the metal wire with nanospaces formed between the nanoparticles, wherein the thermosetting resin fills the nanospaces, and wherein a ten-point average roughness Rz of the surface of the metal is 2.1 µm to 10 µm in an interface between the metal and the thermosetting resin.

7. A process for producing the insulated aluminum wire as defined in claim 6, the process comprising the steps of:
   forming the alumina nanoporous layer by ablating the surface of the metal wire with laser radiation to form nanoparticles adhered to the surface of the metal wire with nanospaces formed between the nanoparticles, and
   forming the thermosetting resin directly on the alumina nanoporous layer, wherein the thermosetting resin fills the nanospaces.

8. A flat cable comprising:
conductors made of aluminum or an aluminum alloy, and
a thermosetting resin layer adhered directly to each of the conductors from both sides of each of the conductors via an alumina nanoporous layer formed directly on a surface of each of the conductors, wherein the alumina nanoporous layer is formed by ablating the surface of each of the conductors with laser radiation to form nanoparticles of 10 nm to 50 nm in average particle diameter adhered to the surfaces of the conductors with nanospaces formed between the nanoparticles, wherein the thermosetting resin fills the nanospaces, and wherein a ten-point average roughness Rz of the surface of the metal is 2.1 μm to 10 μm in an interface between the metal and the thermosetting resin.

9. A process for producing a flat cable as defined in claim 8, the process comprising the steps of:
   forming the alumina nanoporous layer by ablating the surface of each of the conductors with laser radiation to form nanoparticles adhered to the surfaces of the conductors with nanospaces formed between the nanoparticles, and
   forming the thermosetting resin layer directly on the alumina nanoporous layer on each of the conductors, wherein the thermosetting resin fills the nanospaces.

* * * * *